United States Patent [19]
Feller

[11] Patent Number: 4,649,756
[45] Date of Patent: Mar. 17, 1987

[54] FLOW SENSORS

[76] Inventor: Murray F. Feller, Box 1247, Dunnellon, Fla. 32630

[21] Appl. No.: 749,267

[22] Filed: Jun. 27, 1985

[51] Int. Cl.$^4$ .............................................. G01F 1/12
[52] U.S. Cl. .............................. 73/861.83; 73/861.89
[58] Field of Search .......... 73/861.32, 861.33, 861.79, 73/861.83, 861.89, 861.92

[56] References Cited

U.S. PATENT DOCUMENTS

| | | | |
|---|---|---|---|
| 3,203,242 | 8/1965 | Souriau | 73/861.83 |
| 3,240,063 | 3/1966 | Bruechner | 73/861.83 |
| 3,370,465 | 2/1968 | Belle . | |
| 3,559,483 | 2/1971 | Freud . | |
| 3,822,591 | 7/1974 | Li . | |
| 3,972,233 | 8/1976 | Pelt et al. | 73/861.92 |
| 4,324,145 | 4/1982 | Werkmann . | |
| 4,333,354 | 6/1982 | Feller . | |

FOREIGN PATENT DOCUMENTS 2479978 10/1981 France .............................. 73/861.79

Primary Examiner—Herbert Goldstein

[57] ABSTRACT

The disclosed apparatus for sensing the flow of liquid along a passage includes a turbine-type rotor formed of high-resistivity insulation and supported coaxially in the passage. The rotor has spiral vanes distributed about a core. A stator upstream of the rotor provides a spiralling flow pattern in the zone of the rotor. The stator has vanes that spiral in the same direction as the rotor's vanes but at a lower pitch. An electrical sensor provides a varying signal representing the rotation of the rotor. The output signal waves are accurately proportional to the flow over an unusually wide range of flow rates. The electrical sensor includes electrodes exposed to the flow passage, a sensing electrode that is wider than the thickness of a rotor vane and a metal pipe that serves as a companion electrode. Successive pairs of rotor vanes span the sensing electrode at intervals as the rotor turns, periodically acting as barriers that reduce conduction through the liquid in the passage.

7 Claims, 10 Drawing Figures

FLOW SENSORS

This invention relates to flow sensing apparatus that is particularly applicable to detecting and measuring the rate and volume of liquid flow. More particularly, this invention relates to flow sensors that include a turbine-type rotor.

Flow sensors of the turbine-rotor type are widely used in measuring the rate and volume of liquid flow. They have been used with great success, operating quite accurately over a wide range of flow rates, e.g. 30 to 1. As the flow rate declines at the lower end of the range, the flow-representing output signals decrease in frequency but the decrease is disproportionate. An object of this invention resides in providing a novel flow sensor for liquids having a greatly increased low-flow linearity, for thereby extending the linear range.

Wide-range performance can be attained using combinations of flow sensors that are called into effect at different flow rates. A further object of this invention resides in providing a novel flow sensor having a wide range of essentially linear output without resort to costly or complex apparatus.

Conventional flow sensors having turbine-type rotors include a vaned rotor with slant vanes that is rotated by fluid flowing axially along a passage. Axial flow-straightening vanes of a stator upstream of the rotor provide assurance of a uniform axial pattern of flow across the zone occupied by the slant-vaned rotor in a conventional flow sensor. At low flow rates, rotation of the vaned rotor is disproportionately slow.

In novel flow sensors represented in the description below of an illustrative embodiment of the invention, the vanes of the stator upstream of the rotor are shaped to develop a spiralling flow pattern across the zone occupied by the rotor. The flow pattern in the rotor zone includes the basic axial flow component and the pattern also includes a spinning component around the rotor's axis. The resultant flow path slants across the rotor's zone. The rotor's vanes slant in the same direction but more sharply. As a result, the rotor turns in the direction opposite to the spin component of the flow pattern. All of this performance occurs for fast and moderate flow rates. At low flow rates it seems clear that the spin component of the flow pattern fades, the flow becoming purely axial. An axial flow pattern inherently tends to speed the rotation of the rotor because that flow pattern impinges at a greater angle against the slant vanes of the rotor than the fast, slant flow pattern. This transition of the flow pattern, with its tendency to speed up the rotation of the rotor, is a compensating factor that closely approximates the less-than-proportional rotation of the rotor that occurs at low flow rates in conventional flow sensors of this type. The result is that the linear characteristic of the flow sensor is extended considerably at the low flow-rate limit of its range.

Turbine-type flow sensors are equipped with an electrical pick-up that provides output signals accurately representing the rotation of the flow-actuated vaned rotor. Magnetic, induction-coil and photoelectric sensing elements are known for providing flow-representing pulses. My U.S. Pat. No. 4,333,354 issued June 8, 1982 shows a set of electrodes that respond to rotor-induced changes in current patterns in liquid such as water in producing flow-representing signals. A further object of the invention resides in providing a novel simplified, cost-reduced and stable means for producing flow-representing pulses in a flow sensor having a vaned fluid-activated rotor.

In the vaned-rotor flow sensors described in detail below and shown in the accompanying drawings, there is a sensing electrode of large area, much larger than the vane thickness, that is alternately spanned and not spanned by a successive pair of rotor vanes. The rotor and its vanes are formed of insulating material whose resistivity is distinctly higher than that of the liquid whose flow is being monitored. When the sensing electrode is spanned, the spreading conduction paths from the sensing electrode to a nearby electrode are reduced, as compared to such current paths when the sensing electrode is not being spanned. The sensing electrode is amply large so that an edge of a rotor vane placed opposite the sensing electrode has little effect on the total current. As the rotor is driven by flowing liquid whose resistivity is less than that of the rotor, prominent changes occur in the resistance between the sensing electrode and its companion electrode. These fluctuations are converted into flow-representing impulses.

The nature of the invention including the foregoing and other aspects and novel features and advantages will be better appreciated from the following detailed description of an illustrative embodiment which is shown in the accompanying drawings.

Figure 1:
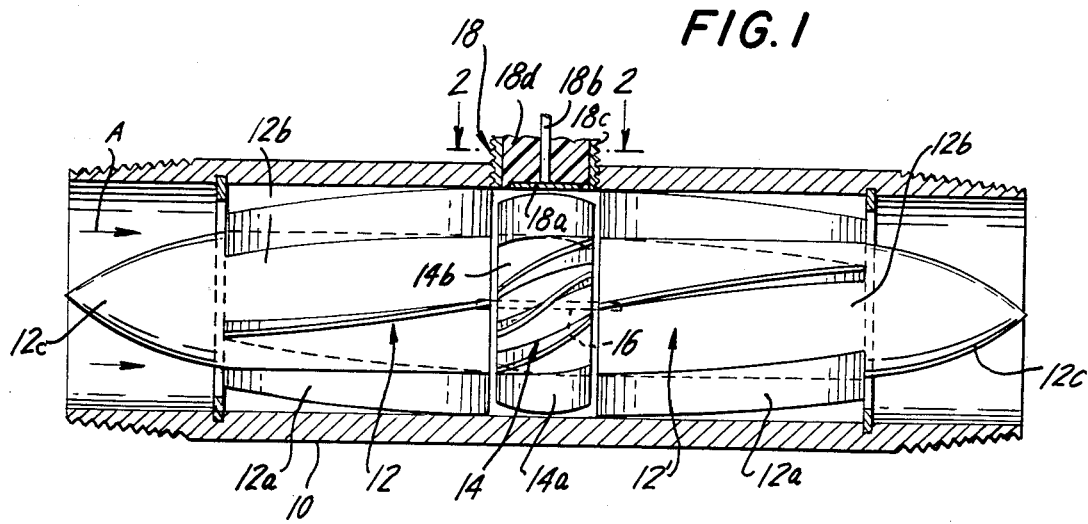
FIG. 1 is a somewhat diagrammatic longitudinal cross-section of a flow sensor embodying certain aspects of the invention.
Figure 2:
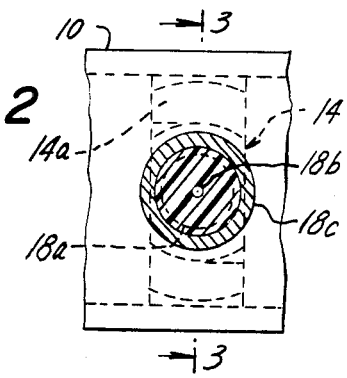
FIG. 2 is a fragmentary top plan view of the flow sensor of FIG. 1, portions being shown in cross-section, some vanes of the flow sensor being omitted from FIGS. 1 and 2 for clarity.

Referring to the drawings, metal pipe 10 contains two vaned stators 12 and 12' spaced apart, providing a zone along the flow passage containing vaned rotor 14. A shaft 16 is supported at its ends in stators 12 and 12'. Jewel bearings (not shown) in rotor 14 support the rotor and thin washers (not shown) space rotor 14 from the stators, for virtually free rotation.

An electrode 18a of stainless steel or other corrosion-resistant metal faces rotor 14 and this electrode is centered halfway between the ends of the rotor. Electrode 18a is shown here as part of an electrical unit 18 that is fixed in the wall of pipe 10.

Sensing electrode unit 18 is threaded into pipe 10 and, preferably, its parts facing rotor 14 are bored to lie along the inner cylindrical surface of pipe 10. Conductor 18b that extends from electrode 18a and tube 18c which is threaded into pipe 10 are coaxial conductors that provide detector connections to the flow sensor. Electrical insulation 18d fixes conductor 18b in place and provides insulating separation between disc electrode 18a and the metal ground 10, 18c of the flow sensor. Of course, electrode unit 18 is made and secured to pipe 10 so as to be leak-proof.

In an example, each of the stators 12 and 12' has twelve vanes 12a distributed at 30° intervals around a cylindrical core 12b. In the same example, rotor 14 has eight vanes 14a on cylindrical core 14b. For clarity, only three stator vanes 12a are shown of each stator 12 and 12' in FIG. 1. The longitudinal edges of each of the stator vanes fit against the cylindrical inner surface of pipe 10, with perhaps minimal clearance, and the rotor vanes 14a have a small clearance from the pipe's inner surface all along their longitudinal edges. In FIG. 1, the appearance of the vanes suggests curved edges, but that is only because the vanes are spiralled around and along cores 12b and 14b. Fluid flows in the direction of arrows A.

A successful example of the described flow sensor is as follows. Cylindrical inside diameter of pipe 10 is 0.755 inch. The diameter of each core 12b and 14b is 0.60 (approx.). The outer diameter of each stator 12 is 0.753 inch and the outer diameter of rotor 14 is 0.730 inch, to the outer or longitudinal edges of vanes 12a and 14a, so that vanes 12a are 0.076 inch high and vanes 14a are 0.065 inch high, extending radially from their respective cores. Each vane is 0.3 inch thick. In this example, the rotor has eight vanes and each stator has twelve vanes so that the rotor vanes are distributed at 45° intervals and the stator vanes are distributed at 30° intervals. Core 14b is 0.30 inch long and vanes 14a extend on the core from end to end. Stator cores 12b are 0.905 inch long. Vanes 12a extend end-to-end on their cores. The vanes have no sharp corners, i.e., their ends and their longitudinal edges are rounded. The stator vanes 12a fit against pipe 10. There is a radial clearance of about 0.010 inch between pipe 10 and vanes 14a. Vanes 14a have a pitch such that a tangent along the edge of vane 14a intersects a line parallel to the rotor axis at 45°. This signifies one inch along the axis at the outer edge for each inch around the axis. The pitch of vanes 12a at their outer edges is one-half that of the rotor vanes, i.e., two inches along the axis for each inch around the axis. In another successful example, all dimensions are as given above, but the pitch of the stator vanes is three times the pitch of the rotor vanes, i.e. three inches along the stator axis for each inch around the axis at the outer edges of the vanes.

Figure 5:
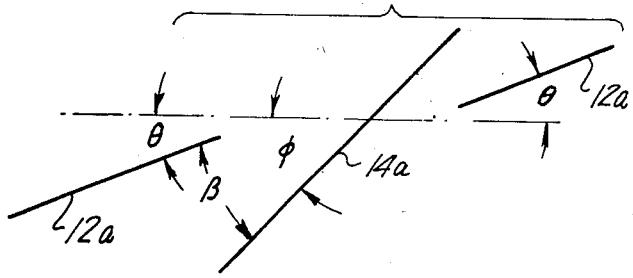
FIG. 5 is a diagram representing the angles of the vanes of the stators in relation to the angle of the rotor vanes in the sensor of FIGS. 1-4.

The relationship of the stator vanes 12a to the rotor vanes 14a is as shown in FIG. 5. The slant of the rotor vanes is in the same direction as the slant of the stator vanes. Angle φ between the outer edge of vane 14a and the length of the rotor is 45° in these examples. The angle θ between the outer edge of each stator vane 12a and the length of the stator is 22½° in the first example described above, and 15° in the second example.

Figure 6:
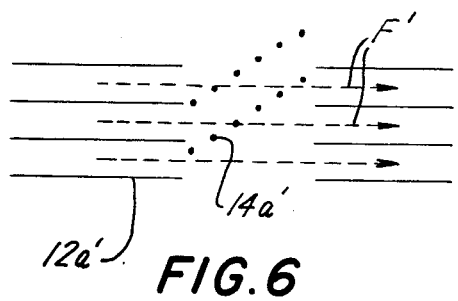
FIG. 6 is a diagram of the flow pattern that develops in a conventional turbine-rotor flow sensor.

FIG. 6 is a diagram of the stator and rotor vanes of a conventional flow sensor in which the stator vanes 12a extend parallel to the rotor axis, establishing an axial flow pattern in the rotor zone. The view represents the longitudinal vane edges that physically lie in a cylinder, but in the diagram the cylinder is "developed" or laid flat. The flow sensor of FIG. 6 is in all respects like that of FIGS. 1–5 except that flow-directing vanes 12a' are "straightening" vanes, parallel to the rotor axis. Vanes 14a' of the rotor are at any suitable slant angle to the flow. The direction of flow is represented by the broken-line arrows F'. Vanes 14a' move down in FIG. 5 as the flow of fluid turns the rotor.

Figure 7:
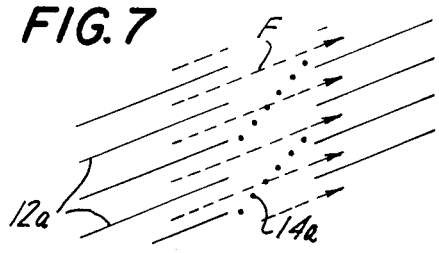
FIG. 7 is a diagram of the flow pattern that develops in exemplary novel flow sensors at moderate and high flow rates.
Figure 8:
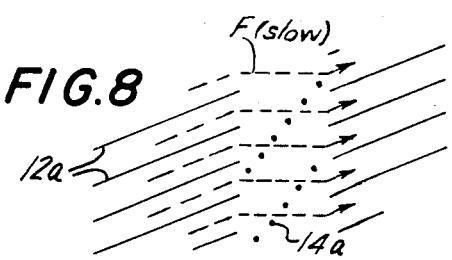
FIG. 8 is a diagram of the flow pattern that evidently develops at low flow rates in the same flow sensors as of FIG. 7.

FIGS. 7 and 8 are both diagrams like FIG. 6, representing the flow sensor of FIGS. 1–5. At moderate and high flow rates, the flow traverses the zone of the rotor along the path represented by arrows F. This is a swirling or spiralling flow pattern in the zone of the rotor, including an ordinary component along the passage, parallel to the rotor axis, and a spin component of the flow pattern along arcs around the rotor axis. The construction involves stator and rotor vanes that all slant in the same direction, where the pitch of the rotor vanes is steeper or shorter than the pitch of the stator vanes. The direction of the circular or spin component around the rotor axis is opposite to the direction of rotation of the rotor.

FIGS. 6 and 7 represent the flow patterns that prevail for moderate and high flow velocities. At moderate and high flow velocities, the rate of rotation of the rotor in the conventional flow sensor and that of the flow sensor of FIGS. 1–5 are remarkably linear or proportional to the flow rate. The rotor in the conventional flow sensor slows disproportionately as the flow rate decreases toward zero. The novel flow sensor maintains the proportionality of rotor rotation versus flow rate to lower rates than in the conventional turbine-rotor flow sensor. FIGS. 7 and 8 provide an explanation.

If a rotor 14 with vanes 14a at a steep pitch were used with conventional straightening vanes (FIG. 6), the rotor would turn at a relatively high rate R' at a moderate flow rate. However, in FIG. 7, the flow pattern has a component that spins about the pipe's axis. Rotor 14 turns at a reduced rate in the sensor of FIG. 7, being R' minus the spin rate of the flow in the rotor zone.

Conditions change at low flow rates. The forward component of the flow along the rotor axis is completely determined by the system. However, the spin component of flow around the rotor axis evidently fades as the forward velocity decreases, and ultimately there is no spin component. At that point (FIG. 8) the rotor turns at a rate that is no longer reduced by a spin component of the flow. The flow pattern f(slow) in the rotor zone has a much larger angle relative to the rotor vanes at such low forward flow rates, producing a tendency to turn the rotor at a disproportionately high rate. That tendency serves to compensate for the factors that result in less-than-proportional rates of turning of the rotor at slow forward flow rates. Fading of the spin component in the flow pattern occurs at or very near the flow rate where loss of linearity occurs in conventional turbine-type flow sensors.

Figure 10:
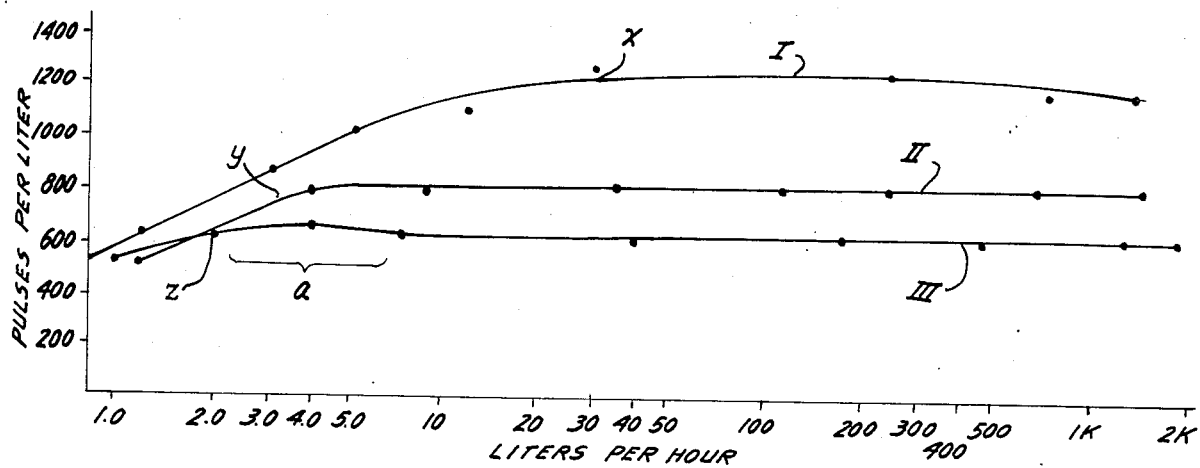
FIG. 10 is a graph of the performance of a conventional turbine-type flow sensor and of two differently proportioned flow sensors of the form in FIGS. 1-4.

FIG. 10 is a graph of the operation of a conventional flow sensor and the two examples of flow sensor described above. All three curves were obtained in tests of a single flow sensor dimensioned as above except that different stators were used in flow sensors corresponding to the three curves.

Curve I represents operation of a conventional flow sensor, having stator vanes aligned with the flow passage. Curve II represents the flow sensor of FIGS. 1–4 having swirl-inducing stator vanes in which the ratio of rotor pitch to stator pitch was 3:1. Curve III represents the same flow sensor with a 2:1 ratio of stator pitch to rotor pitch.

Curve I evidences linear performance from roughly 1000 liters per hour down to about 30 liters per hour. Curve II evidences extension of the linear range to about 4 liters per hour. Curve III shows linear performance down to about 2 liters per hour. Curve III rises slightly at range a above the straight-line characteristic near the lower extreme, suggesting some overcompensation for the factors that ordinarily result in a less-than-proportional rate of rotation of the vaned rotor.

Curves II and III show linearity above the 1000-liter-per-hour rate whereas curve I starts to droop at that rate. This may result from the much higher rate of rotor rotation than the examples of curves II and III where the spiralled "straightening" vanes introduce spin that slows the rotor rotation of a given rotor. Disregarding the slight rise in curve III at 3.0 to 5.0 liters per hour, that curve shows linearity from roughly 2 liters per hour to 2000 liters per hour, a remarkable 1000:1 range.

The angle $\beta$ (FIG. 5) between the flow path and the vanes 12a ($\phi - \theta$) is 30° in the flow sensor of curve II and only $22\frac{1}{2}$° in the flow sensor of curve III, at high and moderate flow rates. It is considered good practice in usual turbine-type flow sensors to have a large angle between the vane and the flow path, 45° for example, to assure good coupling of the rotor to flowing liquid at the lower end of the sensing range. On that basis, the 30° angle $\beta$ in the flow sensor of curve II would be considered marginal and the $22\frac{1}{2}$° angle $\beta$ in the flow sensor of curve III would be considered even worse in conventional turbine-type flow sensors with straightening vanes 12a' (FIG. 6). The rotors in the flow sensors of curves II and III turn at lower speeds than the rotor of curve I, as shown by their lower "pulses/liter".

The lower limit x of linearity in curve I is about 30 liters per hour for the conventional flow sensor of this curve, where angle $\theta$ is zero. The full angle $\phi$ of 45° is available to provide coupling of the rotor vanes to liquid flowing past true straightening vanes and then crossing the zone of the rotor. Introducing a significant angle $\theta$ (the swirl-pattern angle) has the effect of reducing the net angle of coupling $\beta$ between the flow pattern and the rotor vanes. If this reduction in the coupling angle $\beta$ were to be made in a conventional turbine-type flow sensor with true straightening vanes on the upstream stator, the flow sensor would be impaired in that the lower limit of linearity x should be expected to occur at a higher value than 30 liters per hour. Yet in the flow sensors of curves, II and III, where the coupling angle $\beta$ between the swirl-inducing vanes 12a and the rotor vanes is reduced, the flow sensor is improved remarkably, in that the lower limits of linearity y and z are actually shifted to values of flow rate substantially lower than point x.

It is believed that the effectiveness of stator vanes 12a in producing a swirl pattern in the zone occupied by the rotor declines at low flow rates; that the swirl pattern in effect at high and moderate flow rates becomes a straightthrough flow pattern for low flow rates. Under that assumption, a coupling angle $\beta$ of 30° at high and moderate flow rates in the flow sensor of curve II progressively increases and becomes a coupling angle of 45° at very low flow rates. Below that point, the coupling angle $\beta$ does not continue to increase with further reductions in flow rate. Accordingly, the characteristics of the sensors of curves II and III start to droop below points y and z—well below point x of curve I.

There is a further factor that may well contribute to the improvement in extending linearity of these examples of rotor flow sensors to lower flow rates. Bearing friction and similar effects may be responsible to a large extent for the non-linearity of curve I below point x. The rotors of curves II and III turn slower than that of curve I in their linear ranges. This reduces the flow rate at which such effects start to cause disproportionate reductions in the rotation speed and pulses per liter as the flow rate declines. In any case, the reduction in the angle $\beta$ in the sensors of curves II and III becomes feasible only by virtue of the swirl-inducing stator blades.

Extension of linear performance of flow sensors to new lower flow rates signifies improvement in accuracy involving very few liters/hour. In an absolute sense, it is possible that the response at high flow rates might involve an error of as many liters per hour as the total flow at low flow rates. However, the accuracy of flow sensors is stated in terms of error as a percentage of reading. It is for this reason that it is important to extend the linear range of response of flow sensors to lower flow rates.

An electrical signal is to be developed as vaned rotor 14 sweeps past electrode 18a. The signal-developing circuit of FIG. 9 includes alternating-current excitation source 20, series resistor 22 and output coupling capacitor 24. The wall of metal pipe 10 and outer coaxial conductor 18c are connected to the ground return of a-c source 20. Demodulator 26 is coupled to electrode 18a.

Figure 3:
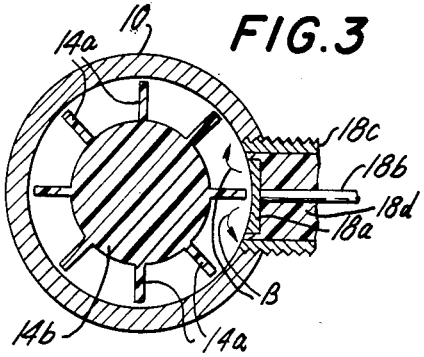
FIG. 3 is a cross-section of the flow sensor of FIGS. 1 and 2 as seen at the plane 3—3 in FIG. 2.
Figure 4:
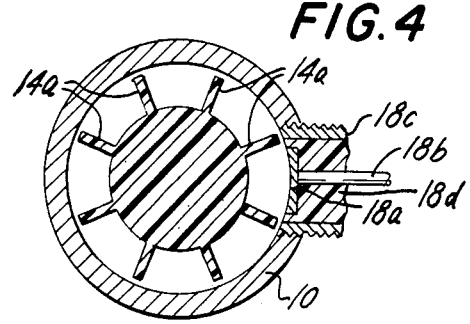
FIG. 4 is a cross-section like FIG. 3 with the rotor shown in a changed attitude.

Electrochemical erosion is avoided by the a-c excitation applied between electrodes 18a and 10/18b, where direct-current excitation could cause erosion. As rotor 14 turns, its vanes develop changing relationships to electrodes 18a, 10/18c as represented in FIGS. 3 and 4. A maximum level of excitation current develops when a rotor vane is centered opposite electrode 18a as in FIG. 3. Arrows B show current distribution from the area of electrode 18a that bypasses the insulation around electrode 18a.

Figure 9:
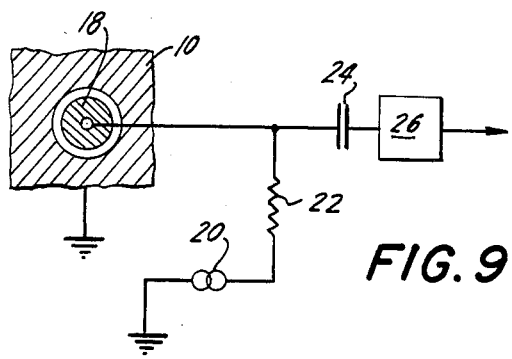
FIG. 9 is a wiring diagram of an electrical circuit for deriving flow-representing pulses in the apparatus of FIGS. 1-4.

After rotor turns $22\frac{1}{2}$° from the position of FIG. 3 (where rotor 14 has eight vanes 14a) two of the vanes become insulating barriers that reduce the current represented by arrow B. The vanes have much higher resistivity than that of the liquid, and they roughly span electrode 18a. In an example, electrode 18a is $\frac{1}{4}$ inch in diameter, the surrounding insulation is 0.01 inch wide and the separation between the outer edges of two successive vanes 14a spanning electrode 18a is about 0.28 inch. In the examples given above of the flow sensor, the thickness of each vane and the clearance of the vanes from the inner surface of the pipe are further factors affecting the reduction in current flow that occurs as the rotor approaches the condition of FIG. 4. In this example of flow sensor, using an excitation of 9.0 volts at 10 kHz, rotation of the rotor produced an amplitude modulated signal varying from 5.0 volts to 5.2 volts peak-to-peak between electrode 18a and ground. In the circuit of FIG. 9, resistor 24 was 10,000 ohms and capacitor 22 was 0.1 mFd. The demodulated signal of 0.1 volt is ample, particularly because it is essentially immune to pick-up of stray electrical interference. The modulated signal is produced in a low-impedance circuit and pipe 10 forms an electrical shield containing the sensing electrode. Both the electrode configuration and the test circuit are remarkably simple, stable and immune to interference, and they are quite inexpensive.

The performance of the apparatus of FIGS. 1-4 and 9 in producing output pulses involves primarily metal sensing electrode 18a, the insulation of vanes 14a and the rotor's core, and areas of metal near electrode 18a, i.e. pipe 10 and connector tube 18c. The vanes 14a operate in the cylindrical passage where the flow activates rotor 14. The area of electrode 18a exposed to the flow passage may be flat, provided that suitable vane-to-electrode clearance is maintained. For purposes of electrically sensing the operation of some forms of vaned-rotor flow sensors, it may be sufficient and even advantageous to limit electrode 10/18 to a cylindrical segment. In the illustrative flow sensor, pipe 10 provides a complete cylindrical passage but, as in probe-type flow sensors where space for installing the sensor may be limited, the shroud around the rotor may be reduced to a cylindrical segment in the vicinity of electrode 18.

The excitation current flows through the liquid, for example tap water, not only in the direction of arrows B—circumferentially in the pipe—but there is also a component of current between electrode 18a and areas of ground-return electrode 10/18b upstream and downstream of electrode 18a. This latter component does not change as the rotor turns and consequently it does not contribute to the rotation-indicating output signal. If there were any problem of that component interfering unduly with the modulation, any such difficulty can be corrected in a contemplated modification in which insulation is provided that covers inside areas of the pipe upstream and downstream of electrode 18a.

The illustrative flow sensing apparatus of FIGS. 1-4 is of course amenable to varied redesign. For example, the bullet-shaped extension 12c of stator core 12b is a refinement to reduce turbulence and pressure drop along the flow passage. Core 12b itself can be streamlined to replace extension 12c. The flow sensor as shown is useful for sensing flow in either direction, but if it becomes important to reduce pressure drop along the flow sensor, the downstream stator can be replaced by a simple bearing for shaft 16 that supports rotor 14. Still further, while the illustrative embodiment involves a pipe providing a flow passage, the same structure can form a probe in a larger passage, to sense a sample of the total flow. In such a probe, a cylindrical shroud of the probe acts as the pipe of the above-described flow sensor.

The illustrative embodiment shown in the drawings and described in detail above may be modified and applied variously by those skilled in the art. Consequently, it should be construed broadly in accordance with its true spirit and scope.

What is claimed is:

1. Apparatus for sensing the flow of liquid, including means providing a cylindrical flow passage, a flow-driven rotor disposed coaxially in said passage, means providing signals representing the rotation of said rotor, and flow-guiding means disposed in said passage where the flow approaches said rotor for producing a spiralling flow pattern in the zone of the passage occupied by said rotor, said flow-guiding means comprising spiralling flow pattern inducing vanes that are stationary throughout the range of flow rates to be monitored, said rotor having a core and vanes on the core that spiral along and around the rotor in the same direction as said spiralling flow pattern but at a pitch substantially shorter than the pitch of the spiralling flow pattern at moderate and high flow rates in the range of flow rates to be monitored, for producing signals proportional to liquid flow over a wide range of flow rates.

2. Apparatus as in claim 1, wherein said rotor characteristically rotates at a rate which is proportional to flow velocity when directed along the passage for moderate and high velocities but which rotates disproportionately slower as the flow velocity decreases below moderate velocity, said rotor and said flow-guiding means for producing a spiralling flow pattern in the rotor-occupied zone being proportioned for essentially compensating for said disproportionately slower rotation of the rotor over a range of relatively slow velocities.

3. Apparatus as in claim 1, wherein at least portions of the spiralling flow pattern inducing vanes nearest the rotor are angled relative to the length of the flow passage so as to develop a substantially smaller angle than 45° between the rotor's vanes and the direction of flow impinging against the rotor's vanes at moderate and high rates of flow.

4. Apparatus as in claim 1, wherein said flow-guiding means includes a stator upstream of said rotor, said stator having a stationary core disposed coaxially in said cylindrical flow passage and aligned with the rotor's core, the stator's core fixedly bearing said vanes of the flow-guiding means.

5. Apparatus as in either of claims 1 and 4, wherein said vanes of said flow-guiding means extend spirally along the passage and spiral around the passage in the same sense as the rotor's vanes but having a spiral pitch longer than that of the rotor's vanes.

6. Apparatus as in claim 1, further including second flow-guiding means downstream of said rotor, said second flow-guiding means including second spiralling flow pattern inducing vanes that are stationary throughout the range of flow rates to be monitored, the vanes of the second flow-guiding means being essentially the same in size and shape as the vanes of the first-mentioned flow-guiding means.

7. Apparatus as in any one of claims 1, 2, 3 and 6 wherein the axial length of the rotor is much greater than the radial height of the rotor's vanes.

* * * * *